(12) United States Patent
Aubert et al.

(10) Patent No.: US 9,563,052 B2
(45) Date of Patent: Feb. 7, 2017

(54) SUPPORT PLATE OF AN ELECTROWETTING DISPLAY

(71) Applicant: Liquavista B.V., Eindhoven (NL)

(72) Inventors: Jozef Elisabeth Aubert, Roermond (NL); Nicolas Eugene Bergeron, Stein (NL); Roy Van Dijk, Eindhoven (NL); Andrea Giraldo, Riehen (CH)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/245,220

(22) Filed: Apr. 4, 2014

(65) Prior Publication Data

US 2014/0218785 A1    Aug. 7, 2014

Related U.S. Application Data (63) Continuation of application No. 12/793,998, filed on Jun. 4, 2010, now Pat. No. 8,730,555, which is a continuation of application No. PCT/EP2008/066942, filed on Dec. 5, 2008.

(30) Foreign Application Priority Data

Dec. 6, 2007   (GB) .................... 0723861.1

(51) Int. Cl.
G02B 26/00    (2006.01)

(52) U.S. Cl.
CPC ........... *G02B 26/005* (2013.01); *G02B 26/004* (2013.01); *B05D 2203/00* (2013.01); *G02B 2207/115* (2013.01)

(58) Field of Classification Search
CPC ..... G02B 26/005; G02B 26/02; G02B 26/004; G02B 2207/115; G02B 1/06

USPC .................................................. 359/290–297
See application file for complete search history.

(56) References Cited

U.S. PATENT DOCUMENTS

| | | | |
|---|---|---|---|
| 7,161,592 B2 * | 1/2007 | Murade ............. | G02F 1/136209 257/294 |
| 7,436,465 B2 * | 10/2008 | Moriya ............. | G02F 1/134336 345/107 |
| 7,522,345 B2 | 4/2009 | Oh et al. | |
| 7,561,131 B2 | 7/2009 | Ijzerman et al. | |
| 7,780,874 B2 | 8/2010 | Liogier D'Ardhuy et al. | |
| 7,826,125 B2 * | 11/2010 | Psaltis .................. | G02B 26/004 359/290 |
| 7,852,547 B2 | 12/2010 | Kim | |

(Continued)

FOREIGN PATENT DOCUMENTS

| | | |
|---|---|---|
| KR | 20060131240 A | 12/2006 |
| KR | 20080060104 A | 7/2008 |

(Continued)

OTHER PUBLICATIONS

UK Search Report from GB0723861.1, mailed Apr. 9, 2008.
International Search Report from PCT/EP2008/066912, mailed Mar. 30, 2009.
International Search Report and Written Opinion from PCT/EP2008/066942, mailed on Jul. 2, 2009.

*Primary Examiner* — Mahidere Sahle
(74) *Attorney, Agent, or Firm* — EIP US LLP (57) ABSTRACT

An electrowetting display device includes a picture element having a first support plate and a second support plate. A surface of a second layer of the first support plate is non-planar and has a shape at least partly corresponding with a pattern of a first layer of the first support plate.

26 Claims, 5 Drawing Sheets

(56) References Cited

U.S. PATENT DOCUMENTS

| | | |
|---|---|---|
| 2005/0012889 A1 | 1/2005 | Ishii et al. |
| 2005/0128389 A1 | 6/2005 | Yang |
| 2006/0017129 A1 | 1/2006 | Nakaji et al. |
| 2006/0285067 A1 | 12/2006 | Kim |
| 2008/0037106 A1* | 2/2008 | Song ................ G02F 1/167 359/296 |
| 2008/0100905 A1 | 5/2008 | Kato et al. |
| 2008/0137213 A1 | 6/2008 | Kuiper et al. |
| 2008/0297880 A1 | 12/2008 | Steckl et al. |
| 2009/0141334 A1* | 6/2009 | Dean et al. ............... 359/290 |
| 2009/0232509 A1* | 9/2009 | Heikenfeld et al. ........ 398/118 |
| 2009/0316253 A1 | 12/2009 | Fairley et al. |
| 2010/0103502 A1 | 4/2010 | Jacobson et al. |
| 2012/0182598 A1* | 7/2012 | Morisue ........... H01L 27/1214 359/296 |

FOREIGN PATENT DOCUMENTS

| | | |
|---|---|---|
| TW | 200705070 A | 2/2007 |
| TW | 200910604 A | 3/2009 |
| TW | 200912715 A | 3/2009 |
| WO | 03071346 A1 | 8/2003 |
| WO | 2004104670 A1 | 12/2004 |
| WO | 2004104671 A1 | 12/2004 |
| WO | 2006017129 A2 | 2/2006 |
| WO | 2006021912 A1 | 3/2006 |
| WO | 2006126129 A2 | 11/2006 |
| WO | 2007141218 A1 | 12/2007 |

\* cited by examiner

SUPPORT PLATE OF AN ELECTROWETTING DISPLAY

CROSS REFERENCE TO RELATED APPLICATIONS

This application claims the benefit of the following applications under 35 U.S.C. §120: U.S. Ser. No. 12/793,998 filed Jun. 4, 2010, (2) PCT/EP2008/066942 filed Dec. 5, 2008, which claims priority to GB 0723861.1 filed Dec. 6, 2007. The contents and teachings of these applications are hereby incorporated by reference in their entirety.

BACKGROUND

Display devices containing fluids which can be switched between different fluid configurations to provide different optical characteristics are known. Several measures have been proposed to control the motion of the fluids within a picture element of the display device.

In a known display device, a movement of the fluids during switching is controlled by using an insulating layer on the first support plate having a particular shape to modify an electric field applied to the fluids. A special electrode structure or an inhomogeneous oil fluid layer may be used alternatively to control the fluid motion.

Another known device has picture elements which have a shape that determines, upon switching, a preferred direction of movement of fluids within the picture elements.

An optical switch containing fluids in which the shape of an electrode used to apply the voltage determines a preferred direction of movement of the fluids upon switching is known.

A known display device has a protruding hydrophilic part on an otherwise flat first support plate. The hydrophilic part operates as oil movement initiator. The arrangement of the protruding part requires an additional process step during the manufacture of this display.

It is desirable to provide a display device in which the control of the fluid motion can be made in a simpler manner.

DETAILED DESCRIPTION

Embodiments described herein relate to an electrowetting display comprising a plurality of picture elements having a first support plate and a second support plate and a space between the first support plate and the second support plate, the space including at least one first fluid and a second fluid immiscible with each other.

Before describing detailed embodiments referencing the figures, embodiments will be described in summary form.

In accordance with an embodiment, there is provided an electrowetting display device comprising a plurality of picture elements having a first support plate and a second support plate and a space between the first support plate and the second support plate, the space including at least one first fluid and a second fluid immiscible with each other, the second fluid being electroconductive or polar; the first support plate including at least one electrode for applying an electric field in the picture element and a layer arranged on a side of the at least one electrode facing away from said space, the layer forming an electronic component for applying a voltage to the at least one electrode; wherein the at least one electrode comprises a height difference corresponding to a thickness of the layer.

The field strength in the first fluid will be higher where the layer of the first fluid is thinner and smaller where the layer is thicker. The changes in height of the one or more electrodes will therefore cause a change in the strength of the electric field over the layer of first fluid. On applying a voltage to the one or more electrodes, the first fluid will move in a direction of lowest electric field. The shape of the height difference, i.e. the pattern of the height difference as seen from the space of the picture element, determines a preferred direction of motion of the first fluid.

The height difference in the at least one electrode is caused by a layer that forms an electronic component for applying a voltage to the at least one electrode. Usually the layer and the electrode are part of a stack of layers arranged on a substrate, the stack and substrate together forming the first support plate. The layer may form one or more electronic components for applying the voltage. An electronic component may be formed by one layer or a plurality of layers.

The desired shape of the height difference may be obtained by an appropriate shape of the electrode and/or an appropriate choice shape of the patterning of the layer, thereby determining the preferred direction of motion of the first fluid. Hence, the layer has the function of both forming an electronic component and creating height differences for the at least one electrode. Since no layers need be arranged in the first support plate specifically for creating the height difference of the electrode, the manufacture of the display device can be simplified.

The layer may be arranged on a substrate of e.g. plastic or glass, so as to cause one or more height differences of the at least one electrode. The correspondence of the height difference of the at least one electrode and the thickness of a layer may reside in the fact that height differences of the electrode are copied from height differences in a patterning of the layer onto which the electrode is arranged, or in the fact that the layer is arranged between two electrodes, thereby determining the height difference between the electrodes. When the layer has a pattern including height differences of for example 300 nm, the copying may result in height difference in the electrode of for example 200 nm. The copying may be made by applying the electrode directly on the patterned layer or by applying the electrode on one or more intermediate layers, which in turn are applied on the patterned layer. Copying may reduce the height differences because of levelling during application of a layer on a patterned layer.

The height difference is determined in a direction perpendicular to a plane defined by the highest points of the at least one electrode of a plurality of picture elements. It should be noted that the height difference relates to the surface of the at least one electrode closest to the space of the picture element, because the position of this surface determines the electric field strength in the space.

The at least one electrode in the first support plate is a conducting layer such that a voltage applied between the second fluid and the electrode causes an electric field extending from the second fluid to the electrode.

In an embodiment of the display device the at least one electrode comprises a first part and a second part and the height difference is between the first part and the second part. When the electrode is applied as a layer on another layer having a height difference, the electrode may copy at least part of the height difference of the other layer. Although both parts of the electrode will be at the same potential, the electric field generated by the two parts will be different because of the difference in height.

In another embodiment the picture element comprises at least two electrodes and the height difference is between the two electrodes. The electric field generated by the two electrodes is now determined by the height difference and the voltages that can be applied to the electrodes. The electrode itself may also have a height difference as in the previous embodiment.

The height difference may have a shape corresponding to a pattern of the layer. The layer is used for forming electronic components for applying a voltage to the at least one electrode. When the layer is applied and patterned on a substrate, in addition to the pattern necessary for the electronic components, extra patterns may be formed in the layer without additional effort. These extra patterns, not forming electronic components, may also be used to create patterns that shape the height differences in the at least one electrode.

When a layer is stated to form an electronic component, the layer may be the only constituent of the electronic component, such as a control line, or the layer may be one of the constituents of the electronic component, such as a source of a transistor.

An embodiment includes a height difference of the at least one electrode that corresponds to a part or pattern of the layer that forms the electronic component. In this embodiment the height difference is due to the one or more electronic components and not to further patterns in the layer.

In an embodiment the electronic component includes any of an electrode, a control line, a transistor and a capacitor. The transistor and capacitor are electronic components typically used in picture elements of so-called active-matrix display devices. When a first electrode is arranged on part of a second electrode, the electrodes will show a height difference. In such a case the second electrode is both an electrode and an electronic component for applying a voltage on the first electrode.

In an embodiment the extent of the picture element is defined by walls arranged in the first support plate and one or more of the control lines being arranged inside the picture element adjacent to one of the walls. The increased height of the electrode near the wall will increase the electric field, preferentially moving the first fluid away from the wall. This reduces pinning of the first fluid near the wall.

When the control line is made thicker to enhance the height difference, its resistance reduces, which may aid the operation of the electronic components. When the control line is made thicker, its width may be reduced. Hence, while maintaining the resistance of the control line, its width as viewed from the space of the picture element can be made smaller, thereby reducing its impact on the optical performance of an electrowetting display.

The one or more height differences of the electrode or electrodes may be arranged such that they form a recess in a corner of the picture element. The reducing height of the electrode will generate an electric field on application of a voltage that causes the first fluid to move preferentially towards the recess. The recess is an area of the surface having a minimum height, the height of the surface being viewed in the direction of the space. The minimum height may be formed by arranging the electronic components in parts of the picture element other than the recess.

The electrode may be arranged in an area of the picture element different from the recess, thereby reducing the field strength in the recess, compared to the rest of the picture element area. The recess may include a further electrode to allow the application of a low voltage compared to the voltage of the second fluid to reduce fringing fields at the edge of said at least one electrode. In an embodiment, the voltage applied to the further electrode is equal to the voltage applied to the second fluid.

The absence of the electrode in the recess may be used to form a depression in the surface of a cover layer in this area. The depression will cause a preferred flow of the first fluid to this corner.

The first support plate may include a further layer other than said layer, and the at least one electrode comprising a height difference corresponding to a thickness of the further layer. In addition to height differences caused by layers forming electronic components, the electrode may also have height differences caused by layers not used for applying a voltage to the electrode. These further layers may be patterned.

In an embodiment of the display device the first support plate includes a conducting layer arranged on a side of the electrode facing away from said space, the electrode and the conducting layer being separated by an insulating layer, and at least one through-connection between the electrode and the conducting layer, the through-connection forming a pinning location for the first fluid.

The through-connection, also called a 'via', causes a depression in the surface of the electrode. The increased thickness of the layer of first fluid and the consequential lower electric field at the position of the through-connection create a location where the first fluid preferentially moves towards. The first fluid may also be attracted to the position because of cohesion effects.

The electrode may have a recess in an area of the picture element and the through-connection arranged close to or in the area. The arrangement of the area of low electric field and the through-connection together will increase the preference of the first fluid to move to this area.

In an embodiment of the display device a cover layer is arranged between the at least one electrode and the space of the electrowetting element. The cover layer may be insulating and have specific electrowetting properties, such as a hydrophilic or hydrophobic property.

When the cover layer is of substantially equal thickness, the surface of the cover layer adjoining the first and/or second fluid, will show similar height differences as the electrode or electrodes. The height differences will cause a difference in thickness of the layer of first fluid adjoining the surface in the state without an electric field. Changes in the thickness of the cover layer will not affect the electric field when the dielectric constant of the material of the cover layer and the first fluid is the same. A local depression in the surface of the cover layer adjoining the fluids may act as a pinning location, as it requires a larger force to move the first fluid from this location than from a flat surface. The pinning effect may be enhanced by a reduced electric field caused by the depression in the electrode.

Embodiments also relate to an electrowetting display device comprising a plurality of picture elements having a first support plate including a surface and a second support plate and a space between the surface of the first support plate and the second support plate, the space including at least one first fluid and a second fluid immiscible with each other, the second fluid being electroconductive or polar; the first support plate including an electrode for applying an electric field in the picture element and covering a first area of the picture element; and a storage capacitor for maintaining a voltage on the electrode, the storage capacitor having two plates; wherein at least one of the plates of the capacitor covers a different, second area of the picture element.

When a voltage is applied to the electrode, an electric field will be generated over the first area. The plate of the capacitor extending over the second area may be set at a voltage to improve control of the motion of the first fluid. The capacitor has a double function in that it is used for maintaining a voltage on the electrode and for controlling the motion directly by generating an electric field over the second area. The plate may be set at the same voltage as the second fluid, thereby reducing fringing fields at the edge of the electrode and forcing the first fluid towards the second area on application of a voltage on the electrode.

The second area may be arranged in a corner of the pixel element, reducing the obstruction of the field of view by the first fluid when the first fluid is retracted by application of the voltage.

A display device having a plate of the capacitor in the second area may have height differences in the surface of the first support plate or no such height differences in the surface.

In an embodiment the first support plate includes a second electrode covering at least part of the second area and may be connected to the at least one of the plates of the capacitor by a through-connection. The second electrode covering at least part of the second area may be set at a voltage to improve control of the motion of the first fluid. The plate may be set at the same voltage as the second fluid, thereby reducing fringing fields at the edge of the electrode and forcing the first fluid towards the second area on application of a voltage on the electrode.

The through-connection to the said plate of the capacitor may be made to form a depression in the surface of the first support plate, thereby creating a preferred motion of the first fluid towards the second area.

The at least one of the plates of the capacitor may be at the same voltage as the second fluid. This reduces the electric field above the capacitor.

Further embodiments relate to an electrowetting display device comprising a plurality of picture elements having a first support plate and a second support plate and a space between the first support plate and the second support plate, the space including at least one first fluid and a second fluid immiscible with each other, the second fluid being electroconductive or polar; the first support plate including at least two electrodes for applying an electric field in the picture element; wherein the at least two electrodes have a height difference.

When two separate electrodes are arranged in a picture element at the same height as is known and different voltages are applied to the electrodes, the fringing fields between the electrodes will be relatively strong and tend to break up the layer of first fluid. It is difficult to reduce this break-up effect by reducing the distance between the two electrodes, because the reduction of distance is limited by manufacturing tolerances. Present-day techniques demand a minimum distance of 6 micrometers for high-end manufacturing and 15 micrometers for low-end manufacturing to avoid problems such as short-circuits. This minimum distance is relatively large compared to the thickness of the layer of first fluid in the state without a voltage applied, which is about 4 micrometers.

The further embodiments arrange the electrodes at a different height within the first support plate. This allows the distance between the electrodes to be set at any desired value, without manufacturing problems and risks of short-circuits. The height may be formed by an intermediate layer having a thickness for example between 100 and 800 nm or up to 4 micrometers. The electrodes may be arranged within the display region of a picture element and exclude control lines; during operation the electrodes are at a substantially constant voltage during a display period, i.e. a period between two consecutive updates of the display information of the picture element.

In an embodiment a distance between the two electrodes in a direction parallel to the first support plate is less than a thickness of a layer of the first fluid in a state where no voltage is applied to the electrodes. The small distance is effective in reducing the fringing fields. When the thickness of the first fluid layer is for example 4 micrometers, the distance between the electrodes should be less than 4 micrometers. A direction parallel to the first support plate is also parallel to the plane defined above for the purpose of the height differences.

When a cover layer is arranged between the two electrodes and the space, the distance may be less than a thickness of the cover layer. The small distance reduces the fringing fields even further. When the cover layer has a thickness of for example 800 nm, the distance should be smaller than 800 nm.

In an embodiment the electrodes overlap. The overlap reduces the fringing field further. In an embodiment a capacitor may be formed in the region of overlap.

Further features will become apparent from the following description of embodiments, given by way of example only, which is made with reference to the accompanying drawings.

Figure 1:
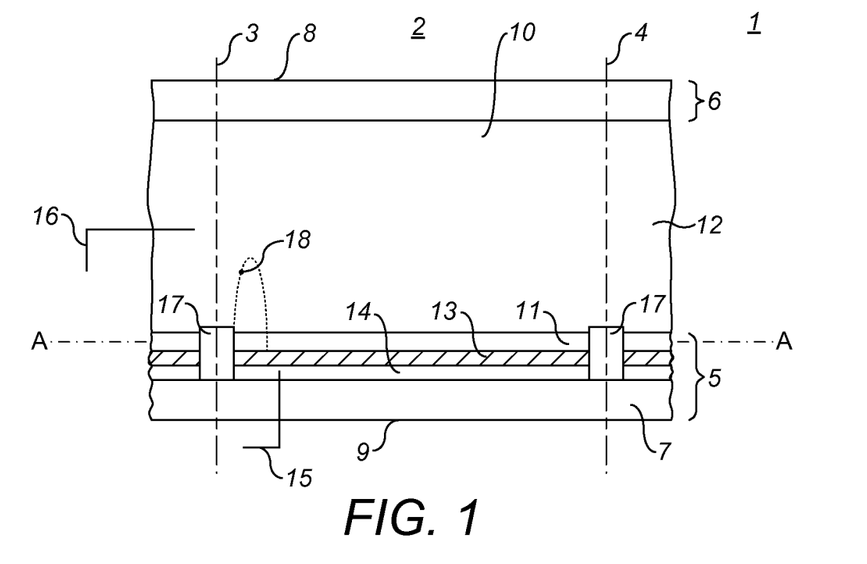
FIG. 1 shows schematically a cross-section of a part of an electrowetting display device.

FIG. 1 shows a diagrammatic cross-section of part of an electrowetting display device 1. The display device includes a plurality of picture elements 2, one of which is shown in the figure. The lateral extent of the picture element is indicated in the figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 7 and may be rigid or flexible.

The display device has a viewing side 8 on which an image or display formed by the display device can be viewed and a rear side 9. In the figure the first support plate 5 faces the rear side; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device.

A space 10 between the support plates is filled with two fluids: a first fluid 11 and a second fluid 12. The second fluid is immiscible with the first fluid. The second fluid is electrically conductive or polar, and may be water or a salt solution such as a solution of potassium chloride in a mixture of water and ethyl alcohol. The second fluid may be transparent, but may be coloured, white, absorbing or reflecting. The first fluid is electrically non-conductive and may for instance be an alkane like hexadecane or (silicone) oil.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a colour.

A hydrophobic layer 13 is arranged on the support plate 5. The layer may be an uninterrupted layer extending over a plurality of picture elements 2 or it may be an interrupted layer, each part extending only over one picture element 2, as shown in the figure. The layer may be for instance an amorphous fluoropolymer layer such as AF1600 or another low surface energy polymer. The hydrophobic character causes the first fluid to adhere preferentially to the first support plate 5, since the first fluid has a higher wettability with respect to the surface of the hydrophobic layer 13 than the second fluid. Wettability relates to the relative affinity of a fluid for the surface of a solid.

Each element 2 includes an electrode 14 arranged on the substrate 7. The electrode 14 is separated from the fluids by an insulating cover layer, which may be the hydrophobic layer 13. The electrode 14 can be of any desired shape or form. The electrode 14 is supplied with voltage signals by a signal line 15, schematically indicated in the figure. A second signal line 16 is connected to an electrode which is in contact with the conductive second fluid 12. This electrode may be common to all elements, when they are fluidly interconnected by and share the second fluid, uninterrupted by walls. The picture elements 2 can be controlled by a voltage V applied between the signal lines 15 and 16. The electrodes 14 on the support plate 5 each are coupled to a display driving system. In a display device having the elements arranged in a matrix form, the electrodes can be coupled to a matrix of printed control lines on the first support plate.

The first fluid 11 is confined to one picture element by walls 17 that follow the cross-section of the picture element. Although the walls are shown as structures protruding from the substrate 7, they may also be a surface layer on the substrate that repels the first fluid, such as a hydrophilic layer. The walls may extend from the second to the first support plate but may also extend partly from the first support plate to the second support plate. The extent of the picture element, indicated by the dashed lines 3 and 4, is defined by the centre of the walls 17.

Further details of the picture elements of the display are described amongst others in international patent application WO 03071346.

When a non-zero voltage V is applied between the signal lines 15 and 16, the picture element will enter into an on-state. Electrostatic forces will move the second fluid 12 towards the electrode 14, thereby repelling the first fluid 11 from at least part of the area of the hydrophobic layer 13 towards the walls 17 surrounding the area of the hydrophobic layer. When completely repelled, the first fluid may take a drop-like form as schematically indicated by a dashed line 18. This action uncovers the first fluid from the surface of the hydrophobic layer 13 of the element. When the voltage across the element is returned to a value of zero or near to zero, the element will return to an off-state, where the first fluid flows back to cover the hydrophobic layer 13. In this way the first fluid forms an electrically controllable optical switch in each picture element.

Figure 2:
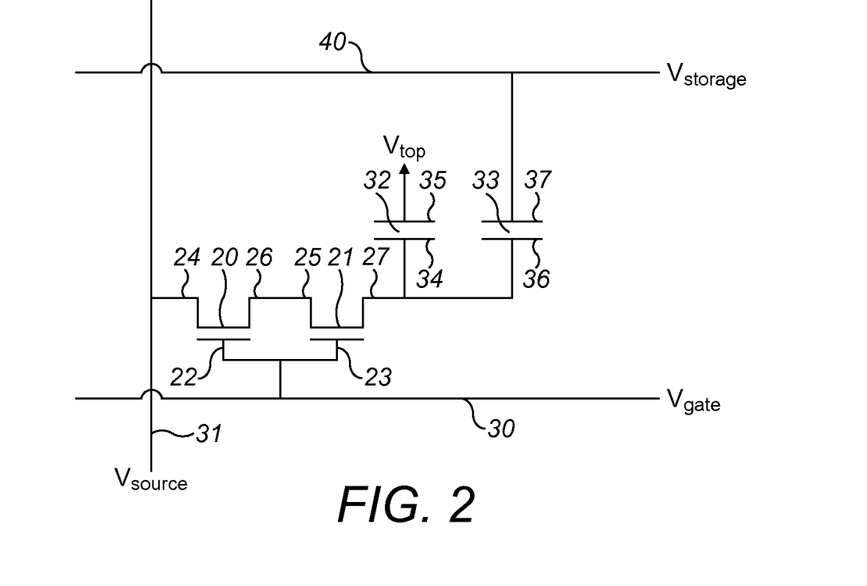
FIG. 2 shows a circuit diagram of a picture element.

FIG. 2 shows a circuit diagram including the electronic components of a picture element of the active matrix type. The components include transistors, capacitors and interconnecting wiring. A picture element may include one or more transistors. The figure shows an embodiment using two thin film transistors (TFTs). The two TFTs 20 and 21, have gates 22 and 23, sources 24 and 25 and drains 26 and 27, respectively. The two transistors are connected in series. Gates 22 and 23 are connected to a gate control line 30 having a voltage Vgate. The source 24 is connected to a source control line 31 having a voltage Vsource. The drain 27 is connected to a capacitor Cew 32 and a capacitor Cst 33. Capacitor Cew is an electrowetting capacitor having a plate 34 formed by the electrode 14 of the picture element in FIG. 1 and a plate 35 formed by the second fluid 12. The plate 35 is connected to a voltage Vtop, which is the voltage applied by signal line 16 to the second fluid. The capacitor Cst is a storage capacitor having plates 36 and 37. Plate 37 is connected to a storage control line 40 to which a voltage Vstorage is applied.

In operation a voltage to be applied to electrode 14, i.e. plate 34, is set on the source control line 31. When a selection pulse is set on the gate control line 30, the transistors 20 and 21 become conducting and the voltage on the source line is applied to both capacitors 32 and 33. After the pulse, the resistance of the transistors increases by several orders of magnitude and the voltage remains on the capacitors during a period determined by the combined capacitance and leakage currents of the two capacitors. Normally the voltage on the picture elements is refreshed sufficiently often to make any effect of a decreasing voltage on the electrode 14 on the display effect of the element not noticeable for a viewer of the display device. The purpose of capacitor 33 is to increase the period between refreshes of the picture element. The dual transistor allows for use of higher voltages than a single transistor. Depending on the voltages required, the switching may also be carried out by a single transistor.

Figure 3:
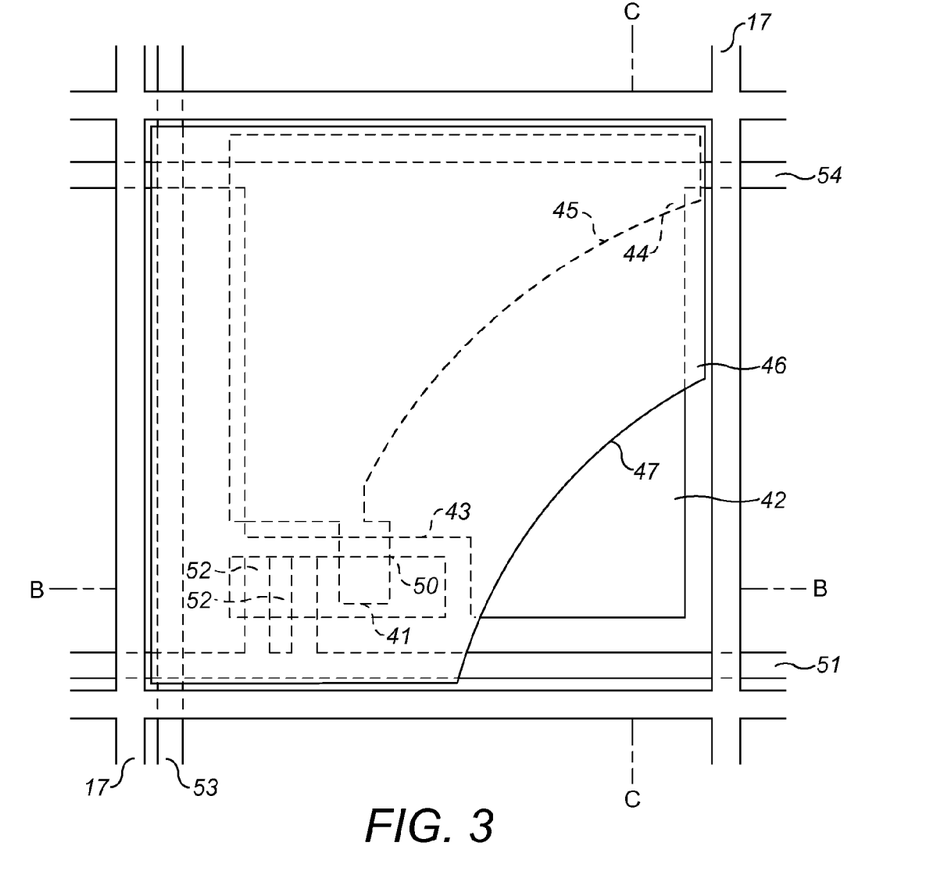
FIG. 3 shows a top view of the first support plate of a picture element.

FIG. 3 shows a top-view of the first support plate 5 of a picture element along line A-A in FIG. 1 and as seen from the space 10. The figure shows one picture element 2 and part of the eight neighbouring elements. The figure shows the walls 17 of the picture element and several electrically conducting elements implementing the circuit diagram of FIG. 2. The extent of a picture element in the plane of the first support plate 5 is the area between the centre of the walls. The area between the walls, to which the first fluid is confined, is called the display region. The edges of an element visible from the space 10 are shown by a drawn line, the edges of an element covered by another element are shown by a dashed line. A typical size of the display region is 145 micrometers by 145 micrometers. For sake of clarity the figure provides details according to embodiments mainly for picture element 2 and not for the surrounding picture elements.

FIG. 3 shows three superposed conductive layers. Although the embodiment in the figure is a so-called field-shielded picture element, other embodiments relate to basic design picture elements. A first layer 42 is closest to the substrate 7 and forms the plate 37 of the capacitor 33 in FIG. 2. Its shape is rectangular with a rectangular part 43 cut out in the bottom left hand corner. A second layer 44 is also a rectangular plate with a curved section, bound by a curved line 45, cut out and lying on top of the layer 42. The layer 44 forms the plate 36 of the capacitor 33. A third layer 46 lies above the layer 44 viewed from the space 10 and is a rectangular plate with a curved section, bound by a curved line 47, cut out. The layer 46 forms the electrode 14 in FIG. 1, i.e. the plate 34 of the capacitor 32 in FIG. 2.

An element 50, lying under the layer 46, includes among others the transistors 20, 21 and several connections arranged on the substrate. Layer 44 has an extension 41 connecting it to the element 50. A conductive strip 51 forms the gate control line 30. Two branches 52 of the strip 51 connect the strip to the element 50. A conductive strip 53 forms the source control line 31, which is connected to the element 50 by a connection not shown in FIG. 3. A conductive strip 54 forms the storage control line 40 and is connected to the layer 42, i.e. the plate 37 of capacitor 33. The control lines may be arranged to the side of, above or under the layers 42, 44 and 46.

Figure 4:
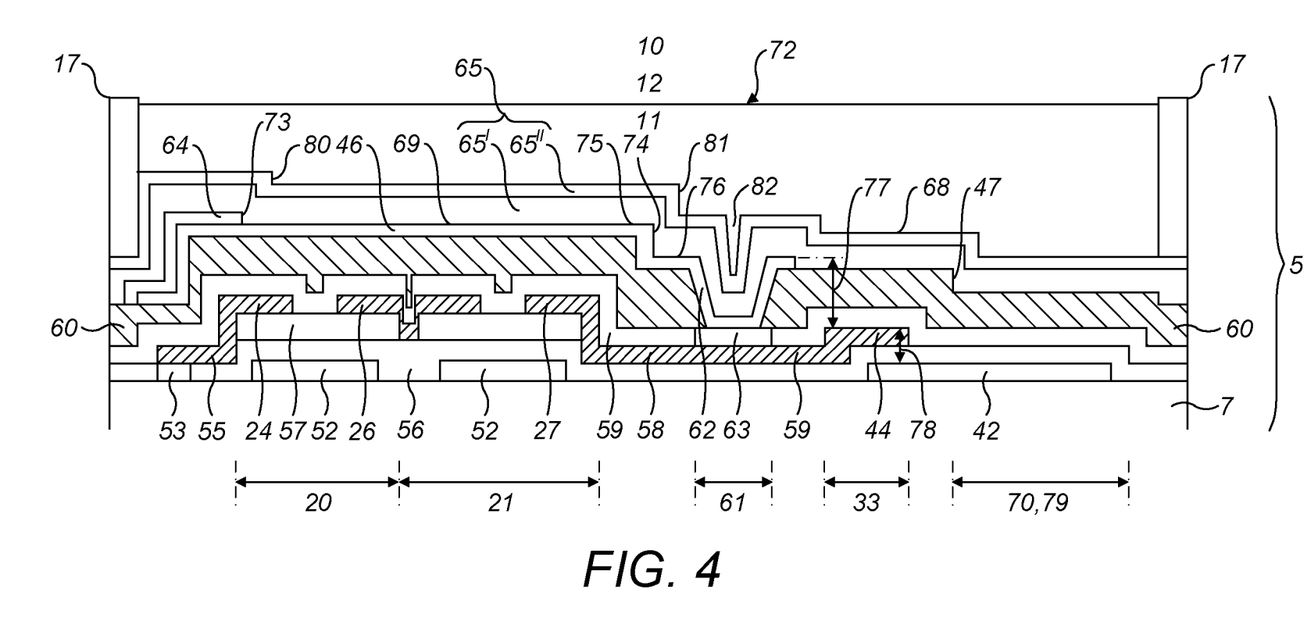
FIGS. 4, 5, 6 and 7 show a cross-section of the first support plate.

FIG. 4 shows a cross-section of the first support plate of an embodiment similar to that of FIG. 3 along the line B-B in FIG. 3. The cross-section is through the element 50 comprising the transistors.

The source line 53, shown in cross-section in FIG. 4, is a conductive strip made of e.g. a metal such as aluminium or a transparent material such as indium tin oxide (ITO). The thickness of the layer may be between 100 nm and 300 nm. A conductive strip 55 connects the source line 53 to the source 24 of the transistor 20. The branches 52 and the gate line 51 may be made of a metal such as aluminium molybdenum and have a thickness between 100 nm and 300 nm. The branches are covered by an insulating layer 56, e.g. made of silicon nitrite, SiNx, which may have a thickness between 150 nm and 300 nm. A layer 57 of amorphous silicon is arranged between the layer 56 and the source 24. The drain 26, may be made of the same metal as the source 24, is arranged on the layer 57. The transistor 21 is build up in the same way. The drain 27 of the transistor 21 is connected by a metal layer 58 to a part of the layer 44, being one of the plates of the storage capacitor 33. The other plate of the storage capacitor is shown as layer 42, may be made of a metal such as aluminium.

The transistors and the storage capacitor are covered by an insulating layer 59, made of e.g. SiNx or SiOx, which may have a thickness between 200 and 800 nm. The insulating layer 59 is covered by a layer 60, which may be made of an organic material having a thickness of about 2 to 4 micrometers. The electrode 46 is arranged on the layer 60 and ends at the curved line 47. The electrode is made of a conductive material. When the display device is of a transmissive type, the electrode may be made of a transparent material such as ITO. When the display device is of a reflective type, the electrode may have the function of reflector and may be made of aluminium neodymium with a thickness between 100 nm and 150 nm. The electrode is connected to the layer 58 by a through-connection 61 through the insulating layers 59 and 60. The through-connection is a local depression 62 in the electrode, such that it is in contact with a layer 63 of conductive material, such as ITO, arranged on the strip 58. The local depression corresponds to the thickness of the layer 60.

When the electrode 46 is reflective and the walls 17 are made of a transparent material, it is undesirable that the electrode extends under the walls, because this will give a disturbing reflection of light incident from the side of the second support plate 6. This reflection will not be affected by the movement of the first fluid. The reflection can be avoided by not extending the electrode 46 under the walls 17, as shown in FIG. 4. When the electrode does not extend until the wall, the electric field near the wall may be weaker than above the electrode 46 or even be zero. This might cause the first fluid to stick to the wall, thereby impeding the motion of the first fluid. The field strength near the wall can be increased, without degrading the optical performance of the display, by applying a layer 64 of transparent, conductive material, such as ITO, on the electrode 46 and extending until the wall or under the wall. The thickness of the layer may be between 30 nm and 200 nm. The layer 64 will not cause undesirable reflections from the walls, because it is transparent.

A cover layer 65 is arranged on the electrode 46 and extends substantially over the area of the picture element. The cover layer may be a hydrophobic layer, made of e.g. AF1600, having a thickness between 200 nm and 1000 nm. It may also comprise two or more layers, e.g. a protective layer of SiNx or SiOx having a thickness between 100 nm and 150 nm on the electrode 46 and a hydrophobic layer of 200 nm to 1000 nm on the protective layer. The cover layer has a surface 68 adjoining the space 10.

The first fluid 11 is shown in FIG. 4 in the off-state. A meniscus 72 between the first fluid 11 and the second fluid 12 is shown as a straight line. The meniscus can also be slightly curved upward or downward, depending on the filling process used for the space and the type of wall 17. In the case of an upward curvature, the thickness of the layer of first fluid in the off-state may vary between 4 micrometers near a wall and 6 micrometers in the middle of the picture element due to the curvature. The total height difference of the surface 68 from left to right in the figure may be 400 to 800 nm.

The total effect of the height differences in the embodiment shown in FIG. 4 is that the height of the surface 68 decreases from the left hand side to the right hand side, forming a recess 70, bounded by the curved line 47 and the walls 17 in FIG. 3.

The conducting layers in the first support plate that cause an electric field extending from that layer to the second fluid are called electrodes. The electrodes are separated from the space 10 only by one or more non-conducting layers. Hence, elements 46 and 64 are electrodes; similarly, layer 44 is an electrode where it faces the space 10 without an intervening conducting layer. The layer 42 is therefore also an electrode over the area without intervening conducting layer. The strength of the electric field over the first fluid 11 in FIG. 4 is determined by the distance between the meniscus 72 and the electrodes in the first support plate and the voltage between the second fluid 12 and the electrodes.

When a voltage is applied between the second fluid and the electrode 46, the electric field is strongest above the electrode 64 and decreases in strength to electrode 46 and even further to electrode 44, because the distance between the meniscus and the electrodes 64, 46 and 44 increases. The distance increases further for electrode 42. Since the voltages applied to electrode 42, Vstorage, and the second fluid 12 are equal, the electric field above electrode 42 is small.

The electric field causes a stronger force on the first fluid near the left wall than in the middle of the picture element, thereby forming a preferred direction of motion to the recess 70. In FIG. 3 this is direction is from top left to bottom right. The recess may also be arranged in one of the other corners of the picture element, the preferred direction of motion then being towards that corner. When the recess is an elongate area along a wall, the preferred direction of motion will be towards this wall. A change in distance of 5 to 10% already has an effect on the motion of the first fluid when changing the picture element from on off-state to an on-state.

The electrodes in FIG. 4 show several height differences. The height differences are at a surface 69 of the electrode that faces the space 10 and determines the distance relevant for the strength of the electric field. A height difference 73 between electrodes 64 and 46 is caused by the arrangement of electrode 64 on electrode 46. A height difference 74 between a part 75 and a part 76 of the electrode 46 corresponds to a thickness of patterned layers 52 and 57, forming the transistors 20 and 21. A height difference 77 between the electrodes 46 and 44 corresponds to the thickness of the layer 60 and the thickness of the electrode 46. A height difference 78 between the electrodes 44 and 42 corresponds to the thickness of the patterned insulating layer 56 and the thickness of the electrode 44, the layer 56 forming the capacitor 33. The height of the electrodes in FIG. 3 decreases from left to right, forming a lowest region in a recess 79, which coincides with the recess 70 in the surface 68 of the cover layer. The height difference 62 of the through-connection 61 corresponds to thickness of the layer 60, through which the connection 63 between the electrode 46 and the layer 58 is made.

The height difference 74 of the electrode 46 corresponds to a height difference in the patterns of the layers 52 and 57 that caused them. The levelling effect of intermediate layers between the patterned layer and the electrode, such as layer 60 may reduce the height differences. The levelling effect may depend on the method of deposition of the intermediate layers, such as vapour deposition or spinning.

In a known embodiment electrodes similar to the electrodes 44 and 42 have been arranged at the same height in the first support plate. The distance between the two electrodes must be at least 6 micrometers for current manufacturing techniques. Since the thickness of the layer of first fluid is approximately 4 micrometers, the fringing fields between the electrodes are relatively strong and tend to break up the layer of the first fluid. The fringing fields are strongly reduced in the embodiment shown in FIG. 3, where the electrodes 44 and 42 overlap, made possible by the height difference between them. The embodiment uses this height difference additionally by forming a capacitor in the region of overlap. The electrodes 44 and 46 overlap in an area to the left of capacitor 33 in FIG. 3. FIG. 4 shows an overlap of the electrodes 42 and 46.

The surface 68 of the cover layer will also show height differences 80 and 81 that correspond to the one or more layers forming the one or more electronic components.

The through-connection 61 forms a depression 82 in the surface 68 typically having a width of 10 micrometers and a depth of 3 or 4 micrometers. The depth may be increased by changing the thickness of the layers.

Figure 5:
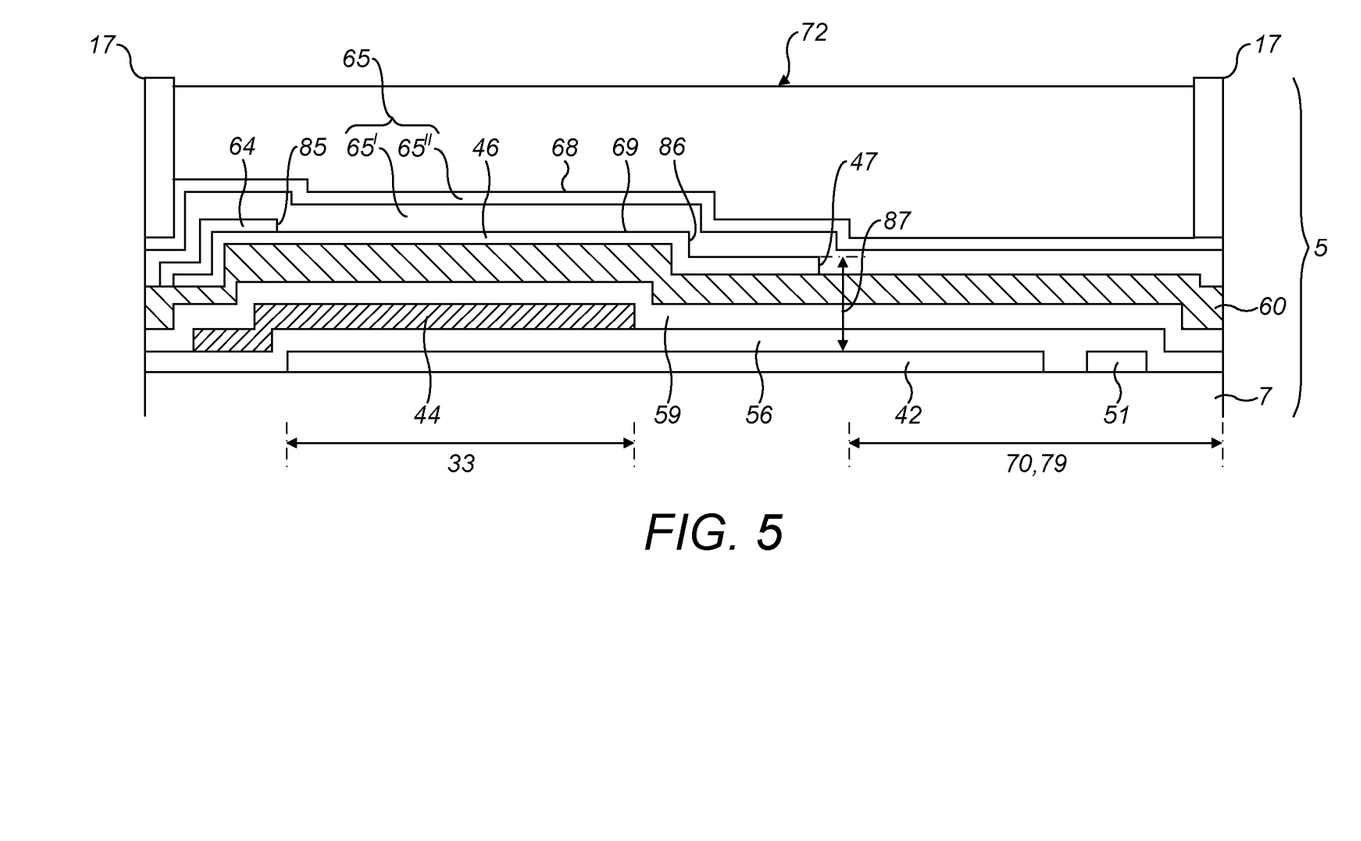

FIG. 5 shows a cross-section of the first support plate along the line C-C in FIG. 3. The area of the storage capacitor 33 and the recess 70, 79 are indicated in the figure.

The layer 42 in FIG. 5 extends beyond a first area in which the storage capacitor 33 is formed into a second area of the recess 70. The layer can be set at the voltage Vstorage through the storage control line 54. When Vstorage is equal or substantially equal to the voltage applied to the second fluid, the electric field over the first fluid in the recess 70 will be small or zero in the on-state. Hence, when the electric field is applied to the picture element by applying a voltage on the electrode 46, the force on the first fluid towards the recess 70 will be increased. This increase in force due to the area with a small electric field will be present both when the surface 68 of the first support plate 5 shows the height differences 69 and when the surface 68 is flat. When the voltage applied to layer 42 is substantially different from the voltage applied to the second fluid, the layer 42 may act as an initiation point for starting movement of the first fluid away from the layer.

The electrodes in FIG. 5 show several height differences. A height difference 85 is caused by arrangement of the electrode 64 on the electrode 46. The height difference 86 is due to the patterned layer 44 forming the plate 36 of capacitor 33. The shape of this height difference is indicated in FIG. 3 as line 45. A height difference 87 between the electrodes 46 and 42 is due to the layer 60 and the thickness of the electrode 46.

Figure 6:
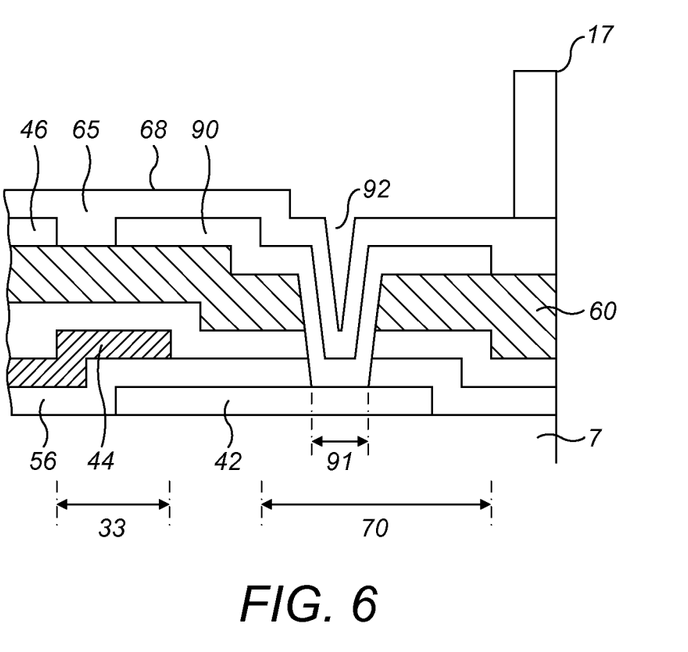

FIG. 6 shows an alternative embodiment to obtain the additional electric field in said second area. The figure shows the right-hand side of FIG. 4. An additional electrode 90 has been arranged on the layer 60, covering the area of the recess 70 and possibly a further area closer to the electrode 46. The electrode 80 is set at a voltage such that a small or a zero electric field is generated in the recess 70. In an embodiment, the voltage on electrode 90 is the same as the voltage on the second fluid, thereby reducing the fringing fields at the curved line 47 forming the edge of electrode 46 in the recess area. In an embodiment the electrode 90 is connected to layer 42. In the figure the connection is made by a through-connection 91, which may have a construction similar to the through-connection 61 shown in FIG. 4. The through-connection 91 forms a depression 92 in the surface 68, acting as a pinning centre for the first fluid, thereby keeping the first fluid in the recess 70.

The effect of the additional electrode 90 will be present both in an embodiment of the display device as shown in FIG. 6, where the surface 68 has height differences and in an embodiment where the surface 68 is flat.

Figure 7:
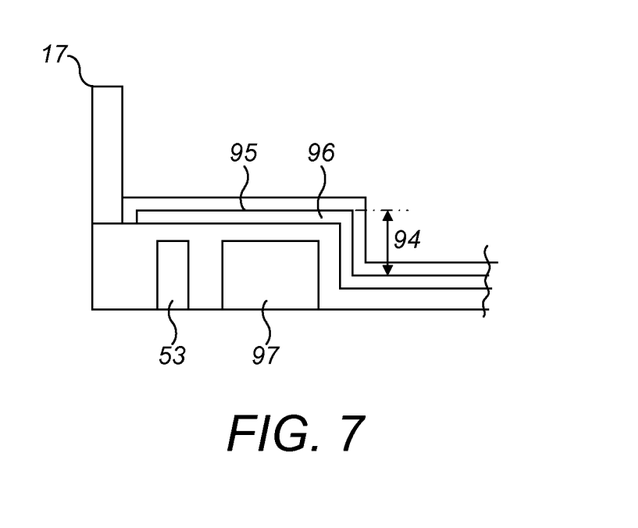

FIG. 7 shows a cross-section of a first support plate where the height of the electrode is determined by a layer forming a control line. The source control line 53 is arranged adjacent to one of the walls 17 of the picture element. The thickness of this control line gives rise to a height difference 94 in a surface 95 of an electrode 96. The increased electric field above the control line will force the first fluid away from the wall when a voltage is applied to the control line, thereby reducing pinning of the first fluid on the wall. Increasing the thickness of the control line also reduces its resistance. These effects can be achieved also with control lines other than the source control line.

The area having the increased field in FIG. 7 has been enlarged by a layer 97 arranged parallel to the layer 53 of the control line and made of the same material. The layers 53 and 97 can be made in one process step by patterning one applied layer into two separate layers. The layer 97 has no function in forming an electronic component.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising:
   a picture element comprising a first support plate, a second support plate and a space between the first support plate and the second support plate, the space comprising a first fluid and a second fluid immiscible with the first fluid, the second fluid being at least one of electroconductive or polar, the first support plate comprising:

an electrode;

a first layer having a first layer pattern, the first layer being at least one electronic component other than part or all of a transistor, the at least one electronic component in contact with the electrode for application of a potential to the electrode to apply an electric field extending between the electrode and the second fluid, a configuration of the first fluid and the second fluid depending on a magnitude of the electric field; and a second layer between the first layer and the space, the second layer having a second layer surface in adjoinment with at least one of the first fluid or the second fluid, the second layer surface having a shape which at least partly corresponds with the first layer pattern, and the second layer surface being stepped between a first part of the second layer surface and a second part of the second layer surface, a plane of the first part of the second layer surface substantially parallel to a plane of the second part of the second layer surface, the electrode located at least partly between the first layer and the second layer.

2. The electrowetting display device according to claim 1, wherein the shape of the second layer surface determines a second layer surface height difference, the second layer surface height difference corresponding to a thickness of the first layer, the thickness being in a direction parallel to the second layer surface height difference.

3. The electrowetting display device according to claim 1, wherein the first layer has a first layer surface and the first layer pattern determines a first layer surface height difference between a first part of the first layer surface and a second part of the first layer surface, the first layer surface height difference being in a direction perpendicular to the first layer surface, the second layer surface having a second layer surface height difference corresponding to the first layer surface height difference.

4. The electrowetting display device according to claim 1, the first support plate comprising a further layer with a further layer surface on which the first layer is formed, the first layer covering a first part of the further layer surface, thereby determining a height difference between a second part of the further layer surface not covered by the first layer and a first layer surface of the first layer closest to the second layer, the height difference being in a direction perpendicular to the first layer surface.

5. The electrowetting display device according to claim 1, wherein the second layer has a substantially equal thickness, the thickness being in a direction perpendicular to the second layer surface.

6. The electrowetting display device according to claim 1, wherein an electrode surface of the electrode closest to the second layer is non-planar and has a shape which at least partly corresponds with the first layer pattern.

7. The electrowetting display device according to claim 1, wherein a dielectric constant of a material of the second layer and a dielectric constant of the first fluid are substantially the same such that the magnitude of the electric field is substantially unaffected by the stepped second layer surface.

8. The electrowetting display device according to claim 1, the electrowetting display device having an off state with no electric field between the electrode and the second fluid, wherein with the electrowetting display device in the off state the first fluid adjoins the second layer surface and has a difference in thickness which corresponds with the first layer pattern, the thickness being in a direction perpendicular to the second layer surface.

9. The electrowetting display device according to claim 1, wherein the second layer is a hydrophobic layer.

10. The electrowetting display device according to claim 1, wherein the first part of the second layer surface is closer to the second support plate than the second part of the second layer surface.

11. The electrowetting display device according to claim 10, wherein a third part of the second layer surface is closer to the second support plate than the second part of the second layer surface.

12. The electrowetting display device according to claim 11, wherein the first part of the second layer surface and the third part of the second layer surface are located at substantially the same distance from the second support plate.

13. The electrowetting display device according to claim 1, wherein the shape of the stepped second layer surface is configured to determine a preferred direction of motion of the first fluid upon application of the electric field.

14. A first support plate for an electrowetting display device comprising a picture element comprising the first support plate, a second support plate and a space between the first support plate and the second support plate, the space comprising, a first fluid and a second fluid immiscible with the first fluid, the second fluid being at least one of electroconductive or polar, the first support plate comprising:

an electrode;

a first layer having a first layer pattern, the first layer being at least one electronic component other than part or all of a transistor, the at least one electronic component in contact with the electrode for application of a potential to the electrode to apply an electric field extending between the electrode and the second fluid, a configuration of the first fluid and the second fluid depending on a magnitude of the electric field; and a second layer to be between the first layer and the space after coupling the first support plate to the second support plate during assembly of the electrowetting display device, the second layer having a second layer surface for adjoinment with at least one of the first fluid or the second fluid, the second layer surface having a shape which at least partly corresponds with the first layer pattern, and the second layer surface being stepped between a first part of the second layer surface and a second part of the second layer surface, a plane of the first part of the second layer surface substantially parallel to a plane of the second part of the second layer surface, the electrode located at least partly between the first layer and the second layer.

15. The first support plate according to claim 14, wherein the first layer has a first layer surface and the first layer pattern determines a first layer surface height difference between a first part of the first layer surface and a second part of the first layer surface, the first layer surface height difference being in a direction perpendicular to the first layer surface, the second layer surface having a second layer surface height difference corresponding to the first layer surface height difference.

16. The first support plate according to claim 14, comprising a further layer with a further layer surface on which the first layer is formed, the first layer covering a first part of the further layer surface, thereby determining a height difference between a second part of the further layer surface not covered by the first layer and a first layer surface of the first layer closest to the second layer, the height difference being in a direction perpendicular to the first layer surface.

17. A method of manufacturing a first support plate for an electrowetting display device comprising a picture element comprising the first support plate, a second support plate and a space between the first support plate and the second support plate, the space comprising a first fluid and a second fluid immiscible with the first fluid, the second fluid being at least one of electroconductive or polar, the method comprising:
    forming an electrode of the first support plate;
    forming a first layer of the first support plate according to a first layer pattern, to form the first layer as at least one electronic component other than part or all of a transistor, the at least one electronic component in contact with the electrode for application of a potential to the electrode to apply an electric field extending between the electrode and the second fluid, a configuration of the first fluid and the second fluid depending on a magnitude of the electric field; and
    forming a second layer of the first support plate, the second layer having a second layer surface for adjoinment with at least one of the first fluid or the second fluid,
    the second layer surface having a shape which at least partly corresponds with the first layer pattern, and the second layer surface being stepped between a first part of the second layer surface and a second part of the second layer surface, a plane of the first part of the second layer surface substantially parallel to a plane of the second part of the second layer surface, the forming the electrode comprising forming the electrode to be located at least partly between the first layer and the second layer.

18. The method according to claim 17, the forming the first layer comprising forming the first layer such that the first layer pattern determines a first layer surface height difference between a first part of a first layer surface of the first layer and a second part of the first layer surface, the first layer surface height difference being in a direction perpendicular to the first layer surface, the forming the second layer comprising forming the second layer such that the second layer surface has a second layer surface height difference corresponding to the first layer surface height difference.

19. The method according to claim 17, comprising providing a further layer having a further layer surface, the forming the first layer comprising forming the first layer on the further layer surface such that the first layer covers a first part of the further layer surface, thereby determining a height difference between a second part of the further layer surface not covered by the first layer and a first layer surface of the first layer closest to the second layer, the height difference being in a direction perpendicular to the first layer surface.

20. The electrowetting display device according to claim 1, the first part of the second layer surface closer to the second support plate than the second part of the second layer surface,
    the shape of the second layer surface comprising a recess between the first part of the second layer surface and a wall of the picture element.

21. The electrowetting display device according to claim 1, the first part of the second layer surface and a third part of the second layer surface closer to the second support plate than the second part of the second layer surface,
    the second part of the second layer surface located between the first part of the second layer surface and the third part of the second layer surface,
    the shape of the second layer surface comprising a recess between the first part of the second layer surface and the third part of the second layer surface.

22. The electrowetting display device according to claim 1, the second layer surface being stepped between the second part of the second layer surface and a third part of the second layer surface, the plane of the second part of the second layer surface substantially parallel to a plane of the third part of the second layer surface,
    the first part of the second layer surface and the third part of the second layer surface closer to the second support plate than the second part of the second layer surface,
    the shape of the second layer surface comprising a recess between the first part of the second layer surface and the third part of the second layer surface.

23. The electrowetting display device according to claim 1, wherein the at least one electronic component comprises at least one of: an electrode, a control line or a capacitor.

24. The first support plate according to claim 14, wherein the at least one electronic component comprises at least one of: an electrode, a control line or a capacitor.

25. The method according to claim 17, wherein the at least one electronic component comprises at least one of: an electrode, a control line or a capacitor.

26. The first support plate according to claim 14, wherein a dielectric constant of a material of the second layer and a dielectric constant of the first fluid are substantially the same such that the magnitude of the electric field is substantially unaffected by the stepped second layer surface.

* * * * *